(12) United States Patent
Wang et al.

(10) Patent No.: US 8,817,194 B2
(45) Date of Patent: Aug. 26, 2014

(54) INTERLACED IMAGE PROCESSING METHOD AND APPARATUS

(75) Inventors: Chi-Feng Wang, Taipei County (TW); Chun-Hsing Hsieh, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1543 days.

(21) Appl. No.: 12/069,220

(22) Filed: Feb. 8, 2008

(65) Prior Publication Data

US 2008/0198267 A1 Aug. 21, 2008

(30) Foreign Application Priority Data

Feb. 16, 2007 (TW) .............................. 96106142 A

(51) Int. Cl.
| H04N 9/77 | (2006.01) |
| H04N 9/78 | (2006.01) |
| H04N 5/00 | (2011.01) |
| H04N 7/01 | (2006.01) |

(52) U.S. Cl.
CPC .................................. H04N 7/0132 (2013.01)
USPC ........ 348/663; 348/440.1; 348/441; 348/607; 348/665

(58) Field of Classification Search
USPC ......................................... 348/607, 663, 665
See application file for complete search history.

(56) References Cited

U.S. PATENT DOCUMENTS

| 5,892,551 A * | 4/1999 | Uematsu ....................... 348/447 |
| 7,663,702 B2 * | 2/2010 | Park et al. ..................... 348/663 |
| 2003/0011709 A1 * | 1/2003 | Kasahara et al. ............. 348/452 |
| 2003/0107673 A1 * | 6/2003 | Sato ............................. 348/529 |
| 2004/0183761 A1 * | 9/2004 | Miyachi et al. ................. 345/87 |
| 2004/0212732 A1 * | 10/2004 | Matsuzaki et al. ............ 348/452 |
| 2005/0078215 A1 * | 4/2005 | Swartz .......................... 348/452 |
| 2007/0182851 A1 * | 8/2007 | Chon et al. .................... 348/525 |

* cited by examiner

*Primary Examiner* — Pankaj Kumar
*Assistant Examiner* — Alazar Tilahun
(74) *Attorney, Agent, or Firm* — McClure, Qualey & Rodack, LLP

(57) ABSTRACT

In an interlaced image processing method for processing fields generated by interlacing and including a plurality of rows of scan signals, the method includes: performing horizontal line detection on a current field so as to determine which of the rows of the scan signals is a horizontal line; according to the horizontal line detection result of the current field and a horizontal line detection result of a previous field, adjusting position of the horizontal line in the current field so as to approach position of a corresponding horizontal line in the previous field; and according to the result of position adjustment, re-sampling the current field. An interlaced image processing apparatus for implementing the method is also disclosed.

29 Claims, 8 Drawing Sheets

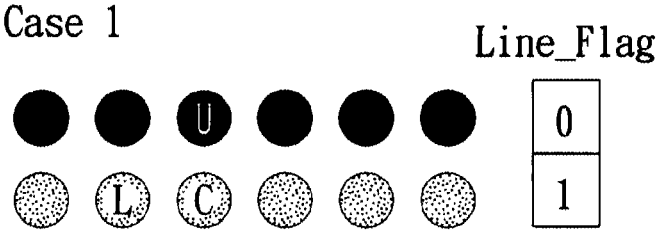
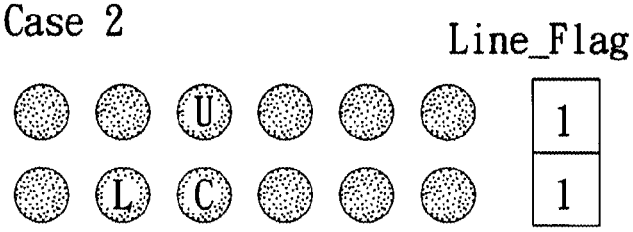
F I G. 4
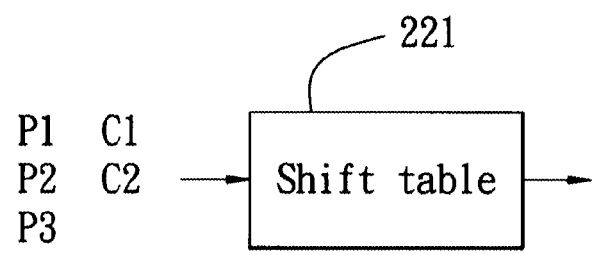
F I G. 5

Case 1
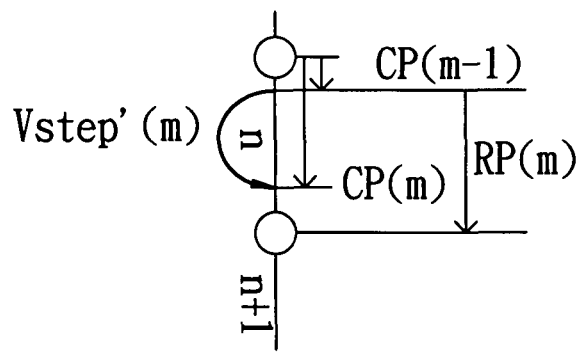
Case 2
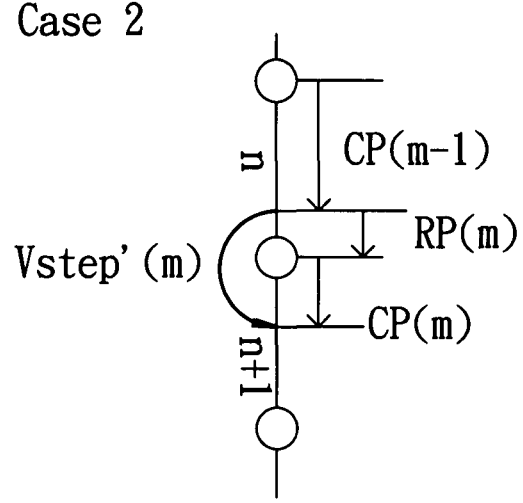
F I G. 8

INTERLACED IMAGE PROCESSING METHOD AND APPARATUS

CROSS-REFERENCE TO RELATED APPLICATION

This application claims priority of Taiwanese Application No. 096106142, filed on Feb. 16, 2007.

BACKGROUND OF THE INVENTION

1. Field of the Invention

The invention relates to an image processing method and apparatus, more particularly to an interlaced image processing method and apparatus.

2. Description of the Related Art

Referring to FIG. 1, to reduce data transmission bandwidth, in conventional broadcasting of television programs, a frame 11 is divided into a top field 13 and a bottom field 15 using an interlacing technique, and the top and bottom fields 13, 15 are subsequently transmitted. The frame 11 includes a plurality of rows of scan signals. Each row of scan signals includes a plurality of pixels. The top field 13 includes odd-numbered rows of scan signals in the frame 11, and the bottom field 15 includes even-numbered rows of scan signals in the frame 11.

A flat panel display displays images using progressive scan. Line doubling is usually employed to display interlaced top and bottom fields 13, 15 using progressive scan. However, the display position of the bottom field 15 is moved ½ line upward in case line doubling is employed.

When line doubling is used to display interlaced top and bottom fields 13, 15 of a frame 11 that has horizontal lines therein, undesired flicker of the horizontal lines is perceived. This is mainly due to non-alignment and varying widths of the horizontal lines. Such a phenomenon is particularly noticeable when continuously playing still images.

Referring to FIG. 2, since the top and bottom fields 13, 15 include different parts of the frame 11, to avoid overly large differences therebetween, a conventional de-interlacing approach employed in the prior art involves subjecting the top field 13 to interpolation so as to generate an interpolated bottom field 17 to be displayed in place of the top field 13. Theoretically, the interpolated bottom field 17 will be similar to the bottom field 15.

Referring to FIG. 2 and Table 1, a simple example is given herein for the purpose of illustration. The top field 13 includes eleven rows of scan signals 131~141. The eleven rows of scan signals 131~141 are first to eleventh scan signals 131~141, respectively, and the pixel values thereof are 0, 100, 0, 100, 100, 0, 0, 100, 0, 100, and 0, respectively. The bottom field 15 includes eleven rows of scan signals 151~161. The eleven rows of scan signals 151~161 are first to eleventh scan signals 151~161, respectively, and the pixel values thereof are 0, 100, 0, 100, 0, 0, 100, 0, 100, 100, and 0, respectively. 0 represents the background pixel value, whereas 100 represents the pixel value of a horizontal line.

The interpolated bottom field 17 is generated as a result of linear interpolation of the top field 13, and includes eleven rows of scan signals 171~181. The eleven rows of scan signals 171~181 are first to eleventh scan signals 171~181, respectively, and the pixel values thereof are 50, 50, 50, 100, 50, 0, 50, 50, 50, 50, and 0, respectively.

The largest pixel value difference between the same row of scan signals in the top field 13 and the bottom field 15 is 100, and the largest pixel value difference between the same row of scan signals in the interpolated bottom field 17 and the bottom field 15 is 50. Since flicker is more evident with an increase in the pixel value difference, although the conventional interpolation approach can slightly reduce flicker, the extent of improvement is still unsatisfactory.

TABLE 1

| Scan signal | Top field | Interpolated bottom field | Bottom field | Difference between top & bottom fields | Difference between interpolated bottom field & bottom field |
|---|---|---|---|---|---|
| Row 1 | 0 | 50 | 0 | 0 | 50 |
| Row 2 | 100 | 50 | 100 | 0 | 50 |
| Row 3 | 0 | 50 | 0 | 0 | 50 |
| Row 4 | 100 | 100 | 100 | 0 | 0 |
| Row 5 | 100 | 50 | 0 | 100 | 50 |
| Row 6 | 0 | 0 | 0 | 0 | 0 |
| Row 7 | 0 | 50 | 100 | 100 | 50 |
| Row 8 | 100 | 50 | 0 | 100 | 50 |
| Row 9 | 0 | 50 | 100 | 100 | 50 |
| Row 10 | 100 | 50 | 100 | 0 | 50 |
| Row 11 | 0 | 0 | 0 | 0 | 0 |

SUMMARY OF THE INVENTION

Therefore, an object of the present invention is to provide an interlaced image processing method that can effectively solve problems associated with horizontal line flicker.

Another object of the present invention is to provide an interlaced image processing apparatus that can effectively solve problems associated with horizontal line flicker.

Accordingly, the interlaced image processing method of the present invention is adapted for processing fields generated by interlacing and including a plurality of rows of scan signals. The method includes the following steps:

performing horizontal line detection on a current field so as to find which of the rows of the scan signals is a horizontal line;

according to the horizontal line detection result of the current field and a horizontal line detection result of a previous field, adjusting position of the horizontal line in the current field so as to approach position of a corresponding horizontal line in the previous field; and according to the result of position adjustment, re-sampling the current field.

The interlaced image processing apparatus of the present invention is adapted for processing fields generated by interlacing and including a plurality of rows of scan signals. The apparatus includes a horizontal line detecting unit, a position adjusting unit, and a calculating unit.

The horizontal line detecting unit is operable to perform horizontal line detection on a current field so as to find which of the rows of the scan signals is a horizontal line. The position adjusting unit is operable to adjust position of the horizontal line in the current field according to result of the horizontal line detection of the current field by the horizontal line detecting unit and a horizontal line detection result of a previous field so as to approach position of a corresponding horizontal line in the previous field. The calculating unit is operable to re-sample the current field according to result of position adjustment by the position adjusting unit.

BRIEF DESCRIPTION OF THE DRAWINGS

Other features and advantages of the present invention will become apparent in the following detailed description of the embodiment with reference to the accompanying drawings, of which:

FIG. 4 is a schematic diagram to illustrate horizontal line detection in the preferred embodiment;

FIG. 5 is a schematic diagram to illustrate adjustment of horizontal line position in the preferred embodiment;

FIG. 8 is a schematic diagram to illustrate calculation of phases of sampling points in the preferred embodiment.

DETAILED DESCRIPTION OF THE PREFERRED EMBODIMENT

Figure 3:
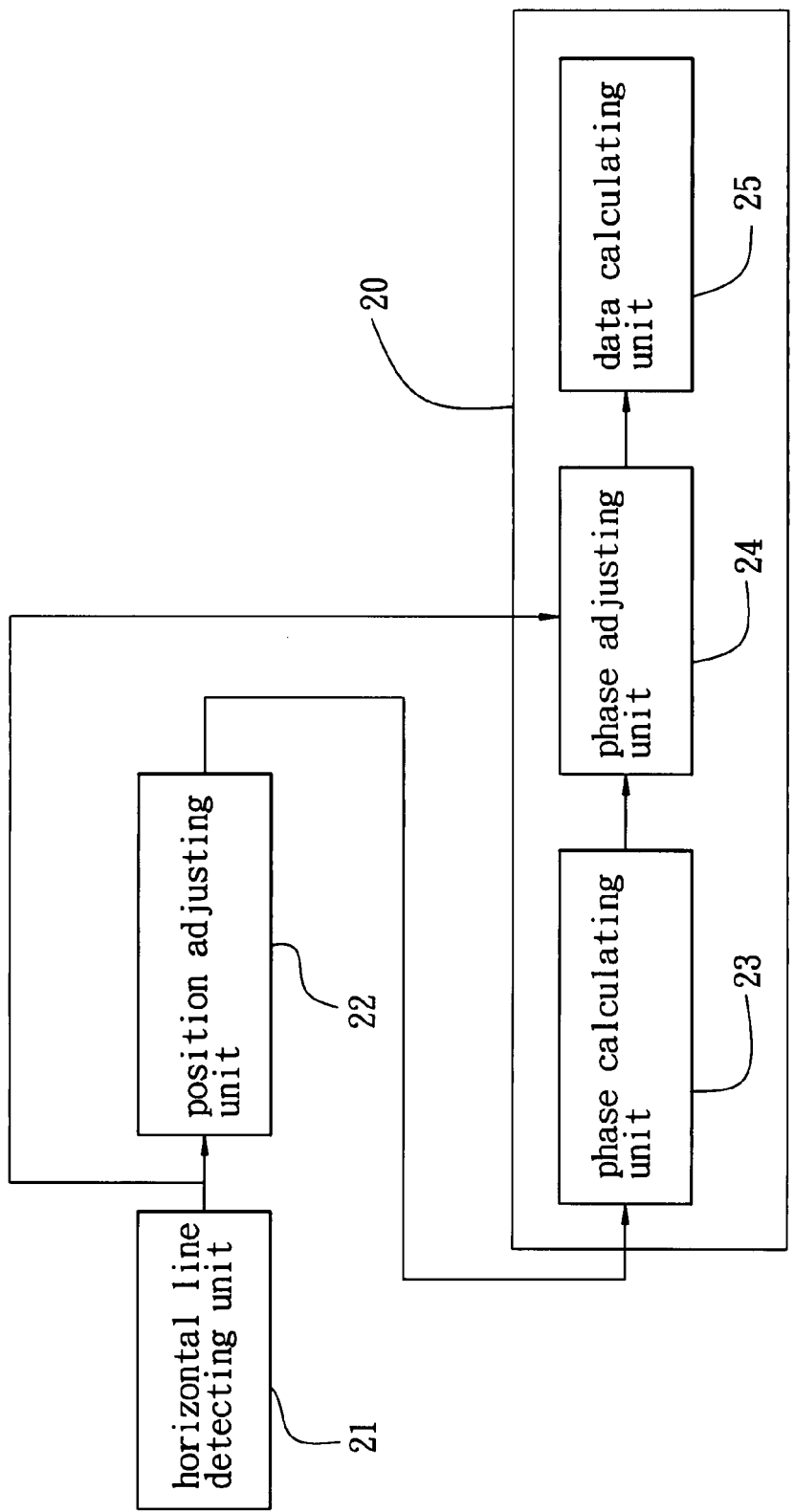
FIG. 3 is a block diagram to illustrate a preferred embodiment of an interlaced image processing apparatus according to the present invention.

Referring to FIG. 3, the embodiment of an interlaced image processing apparatus according to the present invention is adapted for processing fields generated by interlacing. Each field includes a plurality of rows of scan signals, and each row of the scan signals includes a plurality of pixels.

The interlaced image processing apparatus includes a horizontal line detecting unit 21, a position adjusting unit 22, and a calculating unit 20. The calculating unit 20 includes a phase calculating unit 23, a phase adjusting unit 24, and a data calculating unit 25.

Referring to FIGS. 3 and 4, the horizontal line detecting unit 21 is operable to perform horizontal line detection on a current field so as to find which of the rows of the scan signals is a horizontal line.

In this embodiment, the horizontal line detecting unit 21 detects a horizontal line in the following manner:

Making the following determinations with respect to each pixel in a scan signal:

Condition 1: whether a pixel C is very similar to a left pixel L;

Condition 2: whether the pixel C is very dissimilar to an upper pixel U thereabove; and Condition 3: whether the pixel C is very similar to the upper pixel U.

There are two situations where a scan signal is determined to be a horizontal line:

Situation 1: When both conditions 1 and 2 are satisfied, 1 is added to a horizontal line count of the scan signal. If the horizontal line count is greater than a horizontal line count threshold value, a horizontal line flag of the scan signal is set to 1.

Situation 2: If both conditions 1 and 3 and a condition that an adjacent upper scan signal above the scan signal to which the pixel C belongs is a horizontal line are satisfied, the horizontal line flag of the scan signal is set to 1.

It is noted that, in an embodiment of the present invention, pixel value differences can be used when determining if the aforesaid three conditions are satisfied. If the pixel value difference is smaller than a certain threshold value, this indicates similarity. On the other hand, if the pixel value difference is greater than another threshold value, this indicates dissimilarity. However, what is described herein is merely an embodiment of the present invention, and the present invention should not be limited to the above.

Referring to FIGS. 3 and 5, the position adjusting unit 22 is operable to adjust position of a horizontal line in the current field according to result of the horizontal line detection of the current field by the horizontal line detecting unit 21 and a horizontal line detection result of a previous field so as to approach position of a corresponding horizontal line in the previous field. Moreover, when the current field is a top field, the scan signals that are not horizontal lines are shifted upward one-half line to compensate the one-half line upward movement of each bottom field when displayed on a flat panel display.

In this embodiment, the position adjusting unit 22 includes a shift table 221, and adjusts the position of a horizontal line in the following manner:

According to a horizontal line flag C2 of a scan signal in the current field and a horizontal line flag C1 of the scan signal thereabove, and according to horizontal line flags P2, P1 of scan signals in the previous field which are at the same positions as the scan signals in the current field and a horizontal line flag P3 of the scan signal therebelow, the shift table 221 is looked up, and shifts of the scan signals in the current field are outputted.

The shift of the scan signal is in units of lines, and has a value that is one of 0, 0.25, 0.5, 0.75, and −0.25. A positive value represents upward shifting, whereas a negative value represents downward shifting. For example, 0.5 represents upward shifting by one-half line. The shift values of the scan signals can also be designed to be other values, and should not be limited to the aforesaid values.

Figure 1:
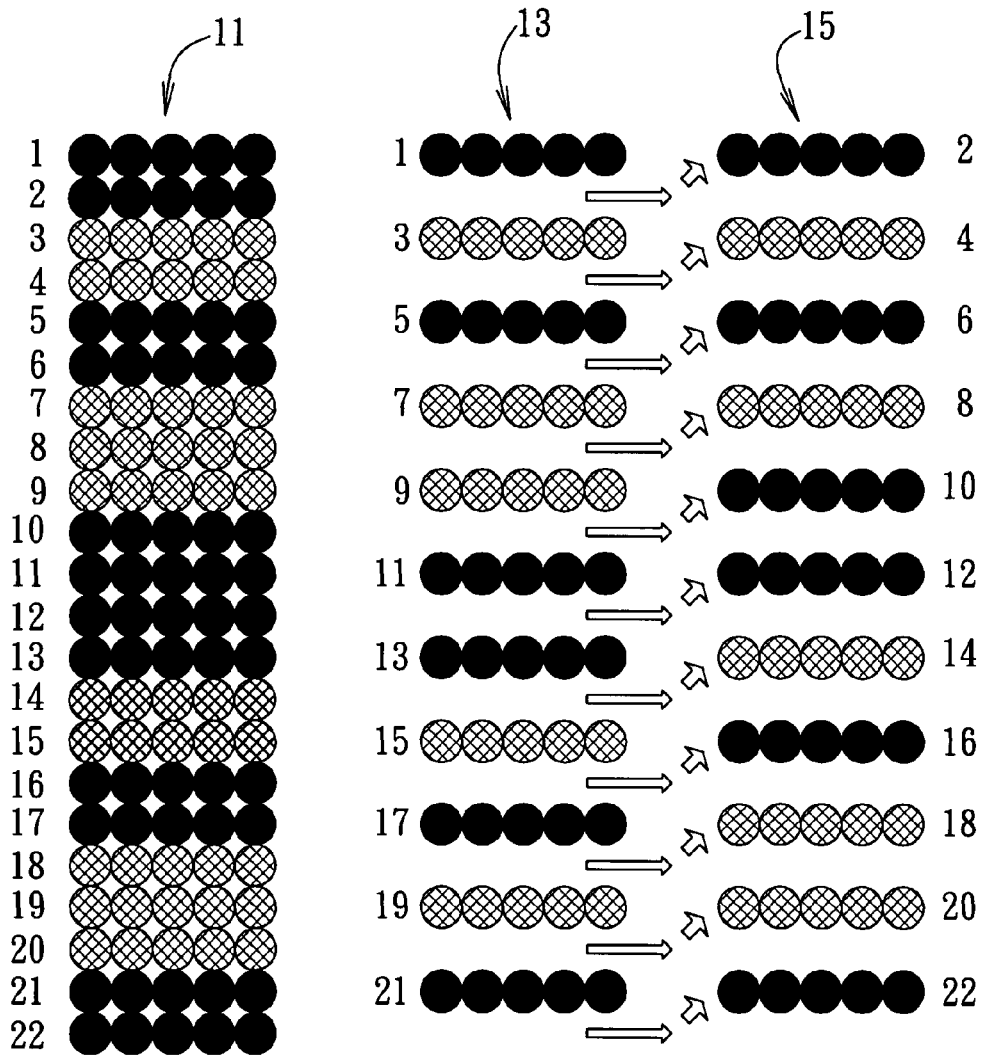
FIG. 1 is a schematic diagram to illustrate splitting of a frame into a top field and a bottom field after interlacing.
Figure 2:
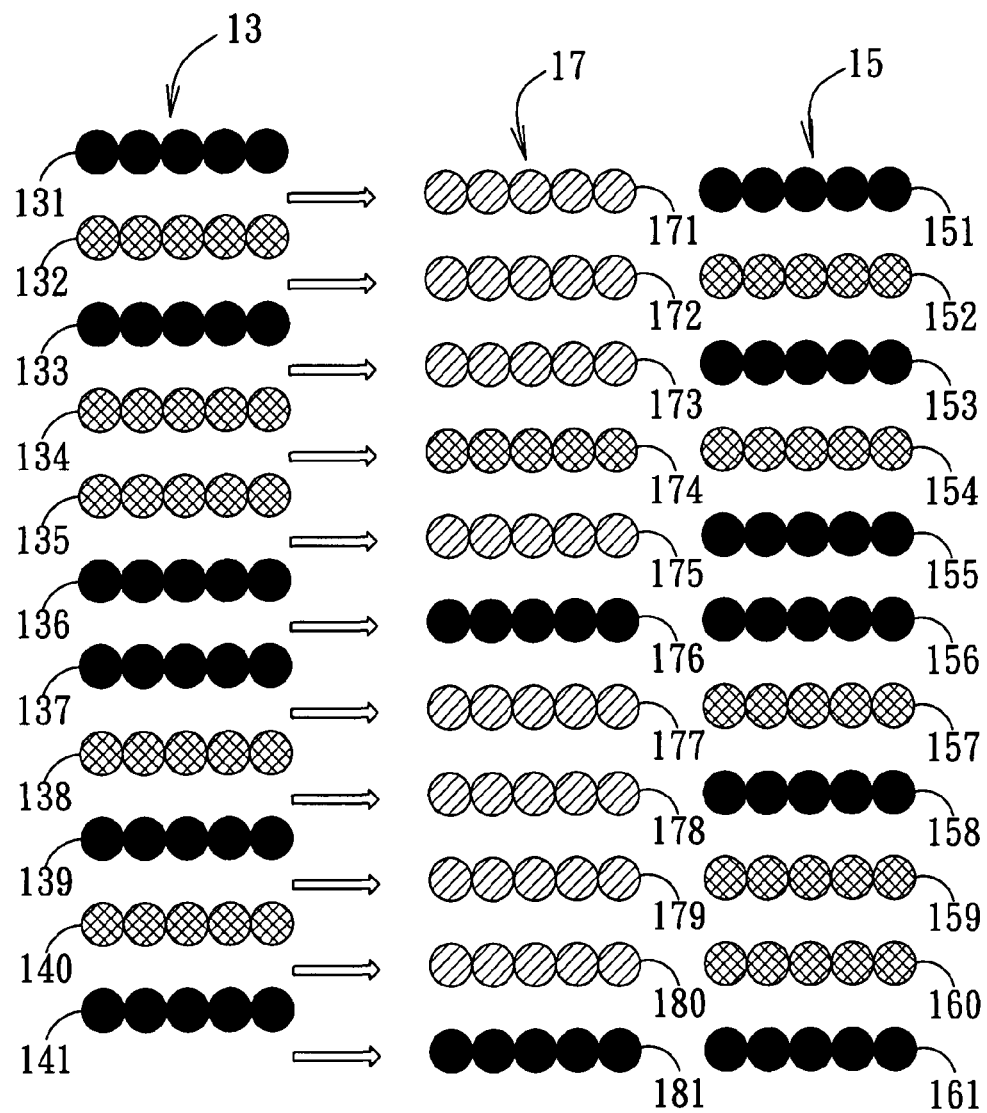
FIG. 2 is a schematic diagram to illustrate generation of an interpolated bottom field after subjecting the top field to interpolation.
Figure 6:
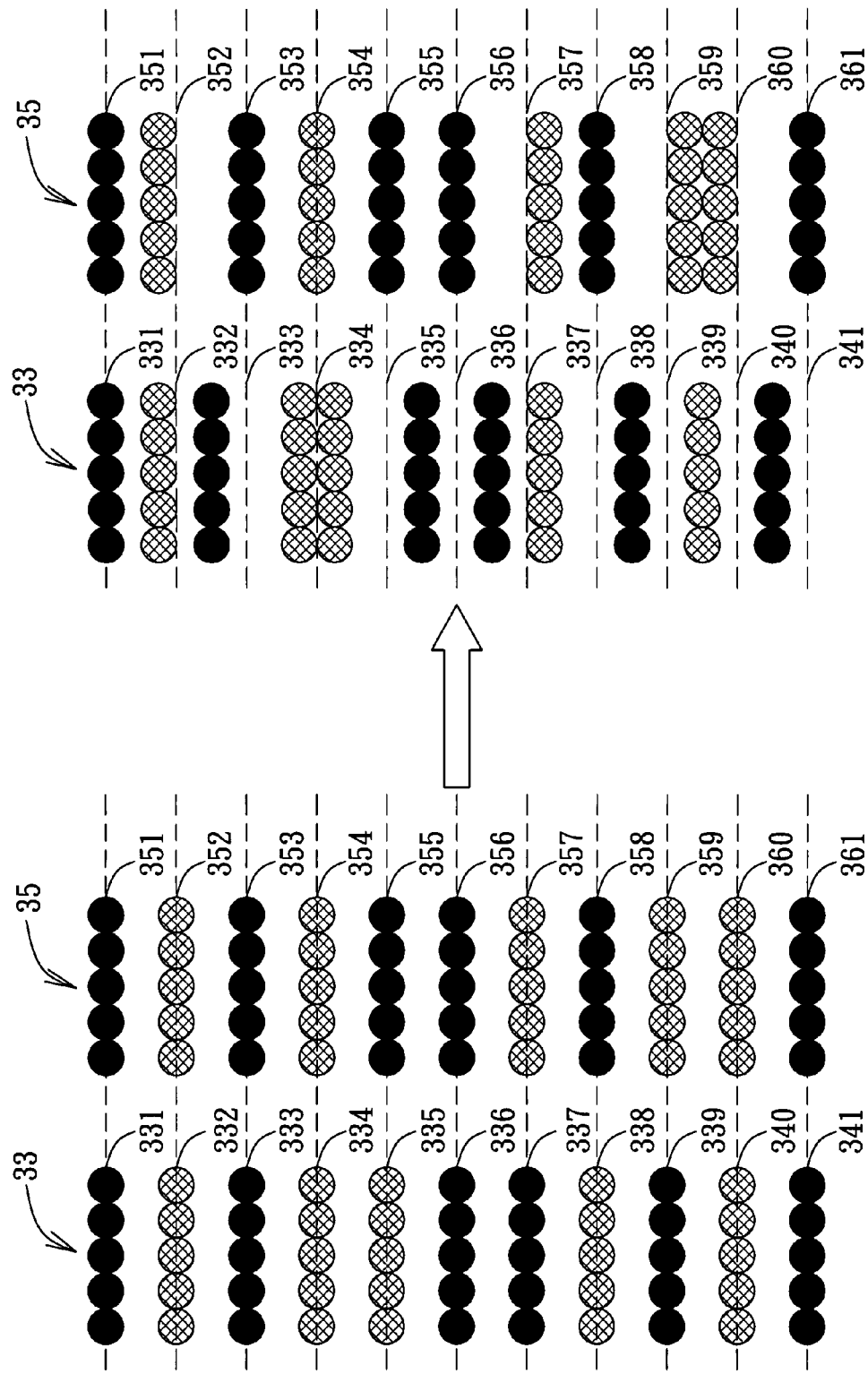
FIG. 6 is a schematic diagram to illustrate results of position adjustment in top and bottom fields.

Referring to FIG. 6 and Tables 2 and 3, the invention will be exemplified herein using an example similar to that of FIG. 2. The top field 33 includes eleven rows of scan signals 331~341. The eleven rows of scan signals 331~341 are first to eleventh scan signals 331~341, respectively, and the pixel values thereof are 0, 100, 0, 100, 100, 0, 0, 100, 0, 100, and 0, respectively. The bottom field 35 includes eleven rows of scan signals 351~361. The eleven rows of scan signals 351~361 are first to eleventh scan signals 351~361, respectively, and the pixel values thereof are 0, 100, 0, 100, 0, 0, 100, 0, 100, 100, and 1, respectively. 0 represents the background pixel value, whereas 100 represents the pixel value of a horizontal line. Table 2 records relevant data of the top field 33, and Table 3 records relevant data of the bottom field 35.

In the top field 33, the second, fourth, fifth, eighth, and tenth scan signals 332, 334, 335, 338, and 340 are horizontal lines, and are respectively shifted 0.25, 0.25, 0.75, 0.75, and 0.5 line. The third, sixth, seventh, ninth and eleventh scan signals 333, 336, 337, 339, and 341 are shifted 0.5 line. In the bottom field 35, the second, fourth, seventh, ninth, and tenth scan signals 352, 354, 357, 359, and 360 are horizontal lines, and are respectively shifted 0.25, 0, −0.25, −0,25 and 0.25 line. Judging from the results of the position adjustment, the positions of the corresponding horizontal lines in the top and bottom fields 33, 35 have approached each other.

Referring to FIG. 3, the phase calculating unit 23 calculates distances between adjacent ones of the scan signals of the current field according to the result of position adjustment by the position adjusting unit 22, and further calculates phases of sampling points according to the calculated distances and a fixed sampling interval.

In this embodiment, the phase calculating unit 23 calculates the distance in the following manner:

Distance $Z(n)$ between a current scan signal and an adjacent upper scan signal thereabove=shift $dL(n-1)$ of the adjacent upper scan signal+1−shift $dL(n)$ of the current scan signal.

Referring to Table 2 and Table 3, the example of FIG. 6 is further used herein for the purpose of illustration. In the top field 33, the distances between the first to eleventh scan signals 331~341 and their respective upper scan signals are 1, 0.75, 0.75, 1.25, 0.5, 1.25, 1, 0.75, 1.25, 1 and 1 line, respectively. In the bottom field 35, the distances between the first to eleventh scan signals 351~361 and their respective upper scan signals are 1, 0.75, 1.25, 1, 1, 1, 1.25, 0.75, 1.25, 0.5 and 1.25 lines, respectively.

Figure 7:
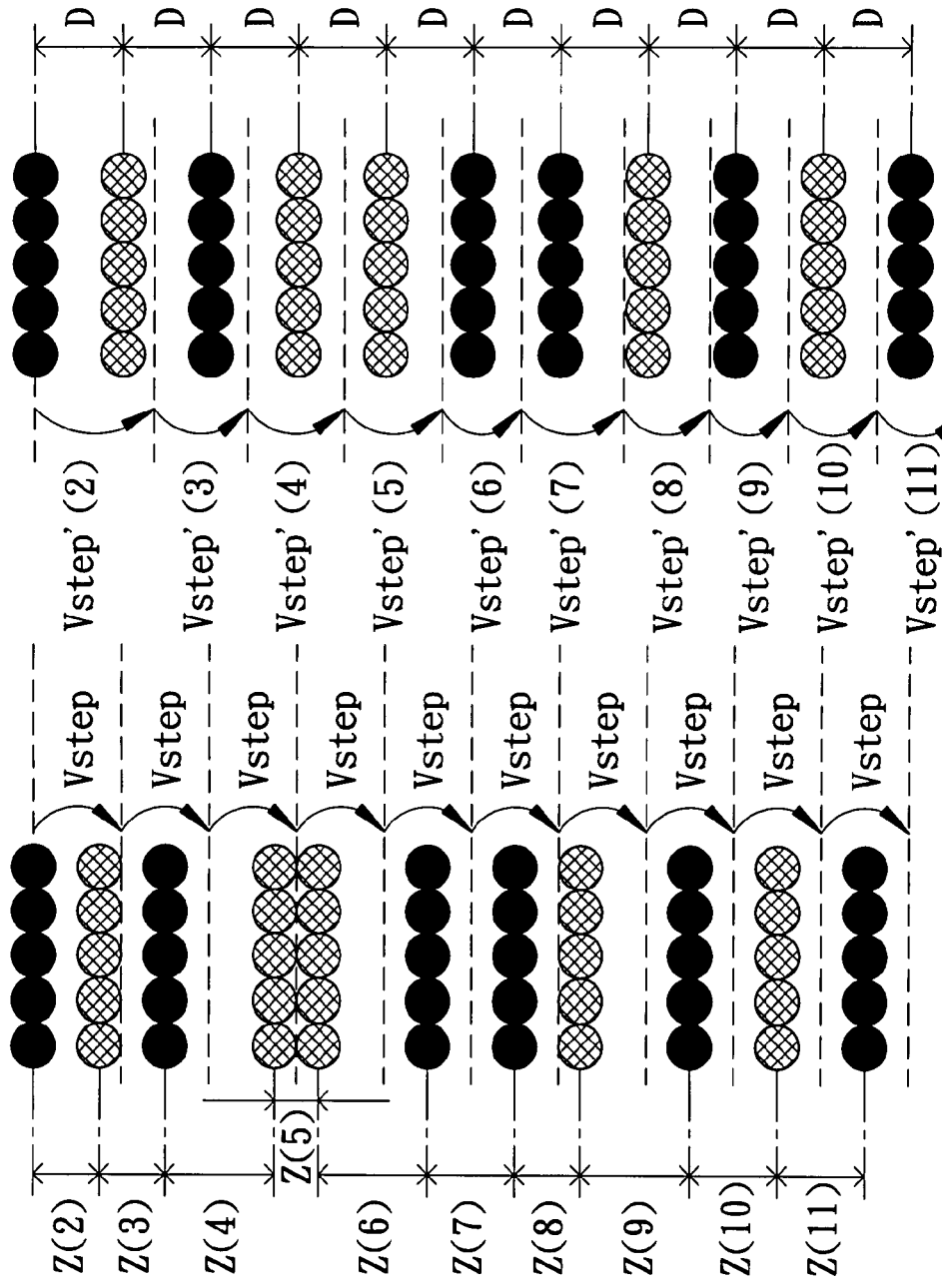
FIG. 7 is a schematic diagram to illustrate that a fixed sampling interval and a variable distance correspond to a variable sampling interval and a fixed distance.

Referring to FIGS. 7 and 8, the phase calculating unit 23 calculates the phase of a current sampling point based on the concept that "fixed sampling interval $V_{step}$ and variable distance $Z(n)$" is equivalent to "variable sampling interval $V_{step}'(m)$ and fixed distance D," and in the following manner:

Current remaining phase $RP(m)$=total phase $TP$ between upper and lower scan signals of the current sampling point−phase $CP(m-1)$ of upper sampling point adjacent to the current sampling point.

There are two situations for the position of a current sampling point and the position of its upper sampling point:

If the current remaining phase $RP(m)$>fixed sampling interval $V_{step}$/distance $Z(n)$ between upper and lower scan signals of the upper sampling point (i.e., the current sampling point and the upper sampling point are in the same slot), the current variable sampling interval $V_{step}'(m)$=fixed sampling interval $V_{step}$/distance $Z(n)$ between the upper and lower scan signals of the upper sampling point, and phase $CP(m)$ of the current sampling point=phase $CP(m-1)$ of the upper sampling point+current variable sampling interval $V_{step}'(m)$.     Situation 1:

If the current sampling point and the upper sampling point are not in the same slot, phase $CP(m)$ of the current sampling point=[fixed sampling interval $V_{step}$−current remaining phase $RP(m)$×distance $Z(n)$ between the upper and lower scan signals of the upper sampling point]/distance $Z(n+1)$ between the upper and lower scan signals of the current sampling point.     Situation 2:

When the fixed sampling interval $V_{step}$ is equal to the total phase TP between the upper and lower scan signals of the current sampling point, the current field size remains unchanged. When the fixed sampling interval $V_{step}$ is smaller than the total phase TP between the upper and lower scan signals of the current sampling point, the current field is enlarged. Otherwise, the current field is reduced. Therefore, a screen can be reduced or enlarged by changing the fixed sampling interval $V_{step}$.

Referring to Table 2 and Table 3, the example of FIG. 6 is further used herein for the purpose of illustration. Supposing the fixed sampling interval $V_{step}$ is equal to the total phase TP between the upper and lower scan signals of the current sampling point. In the top field 33, the phases of the eleven sampling points are 0, 0.33, 0.4, 0.5, 0.6, 0.5, 0.67, 0.6, 0.5, 0.5 and 0.5, respectively. In the bottom field 35, the phases of the eleven sampling points are 0, 0.2, 0, 0, 0, 0, 0.8, 0, 0.8, 0.2 and 0, respectively.

Figure 9:
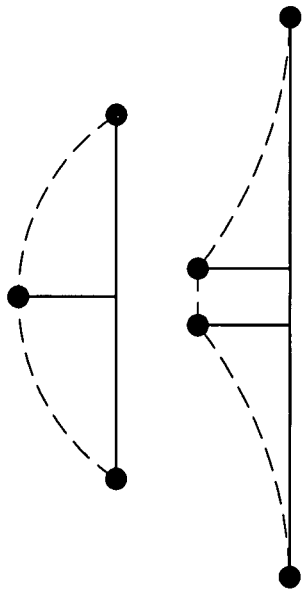
FIG. 9 is a schematic diagram to illustrate adjustment of horizontal line width in the preferred embodiment.
Figure 9:
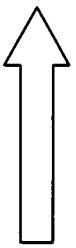
Figure 9:
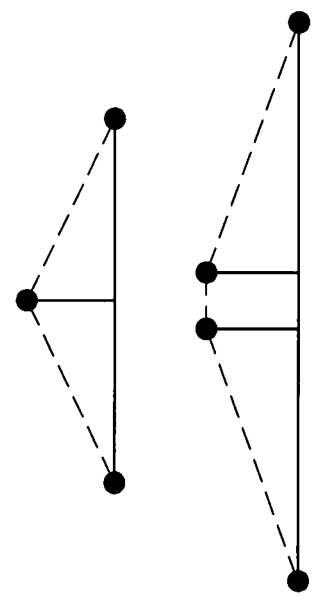

Referring to FIGS. 3 and 9, the phase adjusting unit 24 adjusts the phases of the sampling points calculated by the phase calculating unit 23 according to the result of horizontal line detection by the horizontal line detecting unit 21 and the horizontal line detection result of the previous field so as to make the widths of the horizontal lines in the current field approach the widths of the corresponding horizontal lines in the previous field.

The data calculating unit 25 recalculates the scan signals in the current field by interpolation based on the phases of the sampling points which have been adjusted by the phase adjusting unit 24.

In this embodiment, the phase adjusting unit 24 uses a cosine function to adjust the phases of the sampling points calculated by the phase calculating unit 23, but the present invention should not be limited thereto. Other non-linear mapping schemes can also be employed.

The data calculating unit 25 recalculates the scan signals in the following manner:

Output pixel value Out_Pix $(m)$=[lower pixel value Pix $(n+1)$ of adjusted sampling point−upper pixel value Pix $(n)$ of adjusted sampling point]×phase $CP'(m)$ of adjusted sampling point/total phase TP between upper and lower scan signals of the current sampling point+upper pixel value Pix $(n)$ of adjusted sampling point.

Referring to Table 2 and Table 3, the example of FIG. 6 is further used herein for the purpose of illustration. In the top field 33, phases of the eleven adjusted sampling points are 0, 0.33, 0.19, 0.5, 0.81, 0.5, 0.67, 0.6, 0.71, 0.29 and 0.5, respectively, and the eleven outputted pixel values are 0, 67, 19, 100, 19, 0, 67, 40, 71, 71 and 0, respectively. In the bottom field 35, phases of the eleven adjusted sampling points are 0, 0.2, 0, 0, 0, 0, 0.8, 0, 0.8, 0.2 and 0, respectively, and the eleven outputted pixel values are 0, 80, 0, 100, 0, 0, 80, 0, 69, 69 and 0, respectively.

Referring to FIG. 3, it is noted that this embodiment may dispense with the phase adjusting unit 24. In this case, the data calculating unit 25 recalculates the scan signals of the current field based on the phases of the sampling points which were calculated by the phase calculating unit 23.

Referring to Table 2 and Table 3, the example of FIG. 6 is further used herein for the purpose of illustration. In the top field 33, the eleven outputted pixel values are 0, 67, 40, 100, 40, 0, 67, 40, 50, 50 and 0, respectively. In the bottom field 35, the eleven outputted pixel values are 0, 80, 0, 100, 0, 0, 80, 0, 80, 80 and 0, respectively.

TABLE 2

| Scan signal | Pixel value | Shift | Distance | Phase | Outputted pixel value (without adjusting horizontal line width) | Phase after adjustment | Outputted pixel value (horizontal line width adjusted) |
|---|---|---|---|---|---|---|---|
| First row | 0 | 0 | 1 | 0 | 0 | 0 | 0 |
| Second row | 100 | 0.25 | 0.75 | 0.33 | 67 | 0.33 | 67 |
| Third row | 0 | 0.5 | 0.75 | 0.4 | 40 | 0.19 | 19 |
| Fourth row | 100 | 0.25 | 1.25 | 0.5 | 100 | 0.5 | 100 |

TABLE 2-continued

| Scan signal | Pixel value | Shift | Distance | Phase | Outputted pixel value (without adjusting horizontal line width) | Phase after adjustment | Outputted pixel value (horizontal line width adjusted) |
|---|---|---|---|---|---|---|---|
| Fifth row | 100 | 0.75 | 0.5 | 0.6 | 40 | 0.81 | 19 |
| Sixth row | 0 | 0.5 | 1.25 | 0.5 | 0 | 0.5 | 0 |
| Seventh row | 0 | 0.5 | 1 | 0.67 | 67 | 0.67 | 67 |
| Eighth row | 100 | 0.75 | 0.75 | 0.6 | 40 | 0.6 | 40 |
| Ninth row | 0 | 0.5 | 1.25 | 0.5 | 50 | 0.71 | 71 |
| Tenth row | 100 | 0.5 | 1 | 0.5 | 50 | 0.29 | 71 |
| Eleventh row | 0 | 0.5 | 1 | 0.5 | 0 | 0.5 | 0 |

TABLE 3

| Scan signal | Pixel value | Shift | Distance | Phase | Outputted pixel value (without adjusting horizontal line width) | Phase after adjustment | Outputted pixel value (horizontal line width adjusted) |
|---|---|---|---|---|---|---|---|
| First row | 0 | 0 | 1 | 0 | 0 | 0 | 0 |
| Second row | 100 | 0.25 | 0.75 | 0.2 | 80 | 0.2 | 80 |
| Third row | 0 | 0 | 1.25 | 0 | 0 | 0 | 0 |
| Fourth row | 100 | 0 | 1 | 0 | 100 | 0 | 100 |
| Fifth row | 0 | 0 | 1 | 0 | 0 | 0 | 0 |
| Sixth row | 0 | 0 | 1 | 0 | 0 | 0 | 0 |
| Seventh row | 100 | −0.25 | 1.25 | 0.8 | 80 | 0.8 | 80 |
| Eighth row | 0 | 0 | 0.75 | 0 | 0 | 0 | 0 |
| Ninth row | 100 | −0.25 | 1.25 | 0.8 | 80 | 0.69 | 69 |
| Tenth row | 100 | 0.25 | 0.5 | 0.2 | 80 | 0.31 | 69 |
| Eleventh row | 0 | 0 | 1.25 | 0 | 0 | 0 | 0 |

Referring to Table 4, the example of FIG. 6 is further used herein for the purpose of illustration. Table 4 records pixel value differences between the same rows of scan signals in the top field 33 and the bottom field 35, pixel value differences between the same rows of scan signals in the interpolated bottom field generated as a result of conventional linear interpolation and in the bottom field 35, pixel value differences between the same rows of scan signals in the top field 33 and the bottom field 35 when only the horizontal line positions are adjusted in the embodiment, and pixel value differences between the same rows of scan signals in the top field 33 and the bottom field 35 when the positions and widths of the horizontal lines are adjusted in the embodiment. It can be seen from Table 4 that this embodiment can reduce pixel value differences between the top and bottom fields 33, 35 to thereby reduce undesired flicker of horizontal lines.

TABLE 4

| Scan signal | Difference between top and bottom fields | Difference between interpolated bottom field and bottom field | Difference between top and bottom fields (only positions of horizontal lines are adjusted) | Difference between top and bottom fields (positions and widths of horizontal lines are adjusted) |
|---|---|---|---|---|
| First row | 0 | 50 | 0 | 0 |
| Second row | 0 | 50 | 13 | 13 |
| Third row | 0 | 50 | 40 | 19 |
| Fourth row | 0 | 0 | 0 | 0 |
| Fifth row | 100 | 50 | 40 | 19 |

TABLE 4-continued

| Scan signal | Difference between top and bottom fields | Difference between interpolated bottom field and bottom field | Difference between top and bottom fields (only positions of horizontal lines are adjusted) | Difference between top and bottom fields (positions and widths of horizontal lines are adjusted) |
|---|---|---|---|---|
| Sixth row | 0 | 0 | 0 | 0 |
| Seventh row | 100 | 50 | 13 | 13 |
| Eighth row | 100 | 50 | 40 | 40 |
| Ninth row | 100 | 50 | 30 | 2 |
| Tenth row | 0 | 50 | 30 | 2 |
| Eleventh row | 0 | 0 | 0 | 0 |

In sum, the present invention can reduce pixel value differences between the top and bottom fields 33, 35 by adjusting the positions and widths of corresponding horizontal lines of two adjacent fields to thereby reduce undesired flicker of the horizontal lines.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An interlaced image processing method for processing fields generated by interlacing, the fields including a plurality of rows of scan signals, said interlaced image processing method comprising the following steps:
performing horizontal line detection on a current field so as to find which of the rows of the scan signals is a horizontal line, wherein, in performing the horizontal line detection, a specific determination is made with respect to each pixel of a scan signal, the specific determination comprising a determination as to whether a current pixel satisfies at least one specific condition;
according to the horizontal line detection result of the current field and a horizontal line detection result of a previous field, adjusting position of the horizontal line in the current field so as to approach position of a corresponding horizontal line in the previous field, wherein when adjusting the position of the horizontal line, the rows of the scan signals that are not horizontal lines are shifted upward when the current field is a top field; and
according to the result of position adjustment, re-sampling the current field.

2. The interlaced image processing method of claim 1, wherein, when a pixel value difference between the current pixel and an adjacent pixel to the left of the current pixel is smaller than a first threshold value, and a pixel value difference between the current pixel and an adjacent upper pixel above the current pixel is greater than a second threshold value, 1 is added to a horizontal line count of the scan signal to which the current pixel belongs.

3. The interlaced image processing method of claim 2, wherein, if the horizontal line count of a scan signal is greater than a horizontal line count threshold value, the scan signal is determined to be a horizontal line.

4. The interlaced image processing method of claim 1, wherein, when a pixel value difference between the current pixel and an adjacent pixel to the left of the current pixel is smaller than a third threshold value, a pixel value difference between the current pixel and an adjacent upper pixel above the current pixel is smaller than a fourth threshold value, and an adjacent upper scan signal above the scan signal to which the current pixel belongs is a horizontal line, the scan signal to which the current pixel belongs is determined to be a horizontal line.

5. The interlaced image processing method of claim 1, wherein, in the step of adjusting the position of the horizontal line, a look-up table is used to obtain shifts of the scan signals of the current field so as to adjust the position of the horizontal line.

6. The interlaced image processing method of claim 1, wherein, in the step of re-sampling, distances between adjacent ones of the scan signals of the current field are calculated according to the result of position adjustment, and phases of sampling points are calculated according to the calculated distances and a fixed sampling interval.

7. The interlaced image processing method of claim 6, wherein, in the step of re-sampling, the scan signals of the current field are calculated by interpolation according to the phases of the sampling points.

8. The interlaced image processing method of claim 6, wherein the result of position adjustment is represented by shifts of the scan signals of the current field, and directions of the shifts correspond to values of the shifts.

9. The interlaced image processing method of claim 6, wherein:
distance between a current scan signal and an upper scan signal thereabove=shift of the upper scan signal+1-shift of the current scan signal.

10. The interlaced image processing method of claim 6, wherein, to calculate the phase of a current sampling point, a current remaining phase is calculated to be equal to a total phase between upper and lower scan signals of the current sampling point minus the phase of an upper sampling point adjacent to the current sampling point;
if the current remaining phase is greater than the quotient of the fixed sampling interval divided by a distance between upper and lower scan signals of the upper sampling point, a current variable sampling interval being calculated to be equal to the fixed sampling interval divided by the distance between the upper and lower scan signals of the upper sampling point, and the phase of the current sampling point being calculated to be equal to the sum of the phase of the upper sampling point and the current variable sampling interval;
otherwise, the phase of the current sampling point being calculated to be equal to (the fixed sampling interval minus the current remaining phase x the distance between the upper and lower scan signals of the upper sampling point) divided by a distance between the upper and lower scan signals of the current sampling point.

11. The interlaced image processing method of claim 6, wherein, when calculating a scan signal of the current field, an output pixel value is equal to (lower pixel value of a sampling point-upper pixel value of the sampling point) x the phase of the sampling point/a total phase between upper and lower scan signals of the sampling point plus the upper pixel value of the sampling point.

12. The interlaced image processing method of claim 1, wherein, in the step of re-sampling, width of the horizontal line in the current field is adjusted according to the horizontal line detection result of the current field and the horizontal line detection result of the previous field so as to approach width of the corresponding horizontal line in the previous field, and the current field is re-sampled according to the result of width adjustment.

13. The interlaced image processing method of claim 12, wherein, in the step of re-sampling, distances between adjacent ones of the scan signals of the current field are calculated according to the result of position adjustment, phases of sampling points are calculated according to the calculated distances and a fixed sampling interval, and the scan signals of the current field are calculated by interpolation according to the phases of the sampling points.

14. The interlaced image processing method of claim 13, wherein the result of position adjustment is represented by shifts of the scan signals of the current field, and directions of the shifts correspond to values of the shifts.

15. The interlaced image processing method of claim 13, wherein:
distance between a current scan signal and an upper scan signal thereabove=shift of the upper scan signal+1-shift of the current scan signal.

16. The interlaced image processing method of claim 13, wherein, to calculate the phase of a current sampling point, a current remaining phase is calculated to be equal to a total phase between upper and lower scan signals of the current sampling point minus the phase of an upper sampling point adjacent to the current sampling point;
if the current remaining phase is greater than the quotient of the fixed sampling interval divided by a distance between upper and lower scan signals of the upper sampling point, a current variable sampling interval being calculated to be equal to the fixed sampling interval divided by the distance between the upper and lower scan signals of the upper sampling point, and the phase of the current sampling point being calculated to be equal to the sum of the phase of the upper sampling point and the current variable sampling interval;
otherwise, the phase of the current sampling point being calculated to be equal to (the fixed sampling interval minus the current remaining phase x the distance between the upper and lower scan signals of the upper sampling point) divided by a distance between the upper and lower scan signals of the current sampling point.

17. The interlaced image processing method of claim 13, wherein a cosine function is used to adjust the phases of the calculated sampling points, and the scan signals of the current field are calculated by interpolation according to the phases of the sampling points after adjustment.

18. The interlaced image processing method of claim 13, wherein, when calculating a scan signal of the current field, an output pixel value is equal to (lower pixel value of an adjusted sampling point-upper pixel value of the adjusted sampling point) x the phase of the adjusted sampling point/a total phase between upper and lower scan signals of the adjusted sampling point +the upper pixel value of the adjusted sampling point.

19. An interlaced image processing apparatus for processing fields generated by interlacing and including a plurality of rows of scan signals, said interlaced image processing apparatus comprising:
a horizontal line detecting unit operable to perform horizontal line detection on a current field so as to find which of the rows of the scan signals is a horizontal line;
a position adjusting unit operable to adjust position of the horizontal line in the current field according to result of the horizontal line detection of the current field by said horizontal line detecting unit and a horizontal line detection result of a previous field so as to approach position of a corresponding horizontal line in the previous field, wherein, when the current field is a top field, said position adjusting unit shifts the scan signals that are not horizontal lines one-half line upward; and
a calculating unit operable to re-sample the current field according to result of position adjustment by said position adjusting unit.

20. The interlaced image processing apparatus of claim 19, wherein said horizontal line detecting unit detects a horizontal line by making a specific determination with respect to each pixel of a scan signal, the specific determination being a determination as to whether a current pixel satisfies at least one specific condition.

21. The interlaced image processing apparatus of claim 19, wherein said position adjusting unit adjusts the position of the horizontal line in the current field by obtaining shifts of the scan signals through a look-up table.

22. The interlaced image processing apparatus of claim 19, wherein said calculating unit includes a phase calculating unit, said phase calculating unit calculating distances between adjacent ones of the scan signals of the current field according to the result of position adjustment by said position adjusting unit, and further calculating phases of sampling points according to the calculated distances and a fixed sampling interval.

23. The interlaced image processing apparatus of claim 22, wherein said calculating unit further includes a data calculating unit for recalculating the scan signals of the current field by interpolation according to the phases of the sampling points calculated by said phase calculating unit.

24. The interlaced image processing apparatus of claim 22, wherein the result of position adjustment by said position adjusting unit is represented by shifts of the scan signals of the current field.

25. The interlaced image processing apparatus of claim 22, wherein said data calculating unit calculates an output pixel value equal to (lower pixel value of a sampling point-upper pixel value of the sampling point) x the phase of the sampling point/a total phase between upper and lower scan signals of the sampling point+the upper pixel value of the sampling point.

26. The interlaced image processing apparatus of claim 19, wherein said calculating unit further adjusts width of the horizontal line in the current field according to the result of horizontal line detection of the current field by said horizontal line detecting unit and the horizontal line detection result of the previous field so as to approach width of the corresponding horizontal line in the previous field, and re-samples the current field according to result of width adjustment.

27. The interlaced image processing apparatus of claim 26, wherein said calculating unit includes a phase calculating unit, a phase adjusting unit and a data calculating unit, said phase calculating unit calculating distances between adjacent ones of the scan signals of the current field according to the result of position adjustment by said position adjusting unit, and further calculating phases of sampling points according to the calculated distances and a fixed sampling interval, said phase adjusting unit adjusting the phases of the sampling points calculated by said phase calculating unit according to the result of horizontal line detection of the current field by said horizontal line detecting unit and the horizontal line detection result of the previous field so as to adjust the width of the horizontal line in the current field, said data calculating unit recalculating the scan signals of the current field by interpolation according to the phases of the sampling points adjusted by said phase adjusting unit.

28. An interlaced image processing method for processing fields generated by interlacing, the fields including a plurality of rows of scan signals, said interlaced image processing method comprising the following steps:

performing horizontal line detection on a current field so as to find which of the rows of the scan signals is a horizontal line;

according to the horizontal line detection result of the current field and a horizontal line detection result of a previous field, adjusting position of the horizontal line in the current field so as to approach position of a corresponding horizontal line in the previous field; and according to the result of position adjustment, re-sampling the current field, wherein, in the step of re-sampling, distances between adjacent ones of the scan signals of the current field are calculated according to the result of position adjustment, and phases of sampling points are calculated according to the calculated distances and a fixed sampling interval.

29. The interlaced image processing method of claim 28, wherein, in the step of re-sampling, the scan signals of the current field are calculated by interpolation according to the phases of the sampling points.

* * * * *